United States Patent
Miyamoto

(10) Patent No.: US 11,062,853 B2
(45) Date of Patent: Jul. 13, 2021

(54) SOLID ELECTROLYTIC CAPACITOR, AND METHOD FOR PRODUCING SOLID ELECTROLYTIC CAPACITOR

(71) Applicant: SOKEN CHEMICAL & ENGINEERING Co., Ltd., Tokyo (JP)

(72) Inventor: Takeshi Miyamoto, Sayama (JP)

(73) Assignee: SOKEN CHEMICAL & ENGINEERING Co., Ltd., Tokyo (JP)

( * ) Notice: Subject to any disclaimer, the term of this patent is extended or adjusted under 35 U.S.C. 154(b) by 0 days.

(21) Appl. No.: 16/634,657

(22) PCT Filed: Aug. 1, 2018

(86) PCT No.: PCT/JP2018/028860
§ 371 (c)(1),
(2) Date: Jan. 28, 2020

(87) PCT Pub. No.: WO2019/026961
PCT Pub. Date: Feb. 7, 2019

(65) Prior Publication Data
US 2021/0125788 A1    Apr. 29, 2021

(30) Foreign Application Priority Data
Aug. 4, 2017  (JP) .............................. JP2017-151996

(51) Int. Cl.
*H01G 9/025* (2006.01)
*H01G 9/00* (2006.01)
(Continued)

(52) U.S. Cl.
CPC ........... *H01G 9/025* (2013.01); *H01G 9/0036* (2013.01); *H01G 9/048* (2013.01); *H01G 9/15* (2013.01)

(58) Field of Classification Search
CPC ...... H01G 9/025; H01G 9/0036; H01G 9/048; H01G 9/15
See application file for complete search history.

(56) References Cited

U.S. PATENT DOCUMENTS

| 2005/0111165 A1* | 5/2005 | Merker ................. H01G 11/48 361/525 |
| 2010/0103590 A1* | 4/2010 | Saida .................... C08G 61/126 361/525 |

(Continued)

FOREIGN PATENT DOCUMENTS

| JP | 2014-86473 A | 5/2014 |
| WO | 2013/081099 A1 | 6/2013 |
| WO | 2016/111277 A1 | 7/2016 |

OTHER PUBLICATIONS

Extended European Search Report dated Aug. 6, 2020, including the Supplementary European Search Report and the European Search Opinion, in connection with corresponding EP Application No. 18841955.0 (10 pp.).

(Continued)

*Primary Examiner* — Dion Ferguson
(74) *Attorney, Agent, or Firm* — Maier & Maier, PLLC

(57) ABSTRACT

A solid electrolytic capacitor comprising an anode body having pores, a dielectric, a first conductive polymer layer and a second conductive polymer layer is provided. The dielectric is formed on a surface of the anode body. The first conductive polymer layer includes a first conductive polymer having at least one of structural units represented by the following formula (1) and the following formula (2) and is formed on the dielectric. In the formulas (1) and (2), $R^1$ is an alkyl group having 1 to 12 carbon atoms, an alkoxy group having 1 to 12 carbon atoms, an alkylene oxide group having 1 to 12 carbon atoms, an aromatic group, or a heterocyclic group, each of which optionally has a substituent, $A^-$ is a monoanion derived from a dopant and n is 2 or more and 300 or less.

3 Claims, 1 Drawing Sheet

(51) Int. Cl.
*H01G 9/048* (2006.01)
*H01G 9/15* (2006.01)

(56) References Cited

U.S. PATENT DOCUMENTS

| | | |
|---|---|---|
| 2014/0211372 A1 | 7/2014 | Sugawara et al. |
| 2014/0268501 A1* | 9/2014 | Biler .................... H01G 9/0029 |
| | | 361/524 |
| 2014/0328007 A1 | 11/2014 | Endo |
| 2017/0186553 A1* | 6/2017 | Intelmann .............. H01G 9/028 |
| 2017/0236647 A1* | 8/2017 | Intelmann ................ H01G 9/15 |
| | | 427/80 |
| 2018/0137985 A1* | 5/2018 | Petrzilek ................ H01G 9/025 |
| 2018/0321090 A1* | 11/2018 | Petrzilek ................ G01R 31/64 |

OTHER PUBLICATIONS

Wen-Chang Chen, et al., "Theoretical and Experimental Characterization of Small Band Gap Poly(3,4-ethylenedioxythiophene methine)s", Macromolecules, vol. 37, 2004, pp. 5959-5964 (6 pp.).
International Search Report dated Sep. 25, 2018 in corresponding International application No. PCT/JP2018/028860; 1 pages.

* cited by examiner

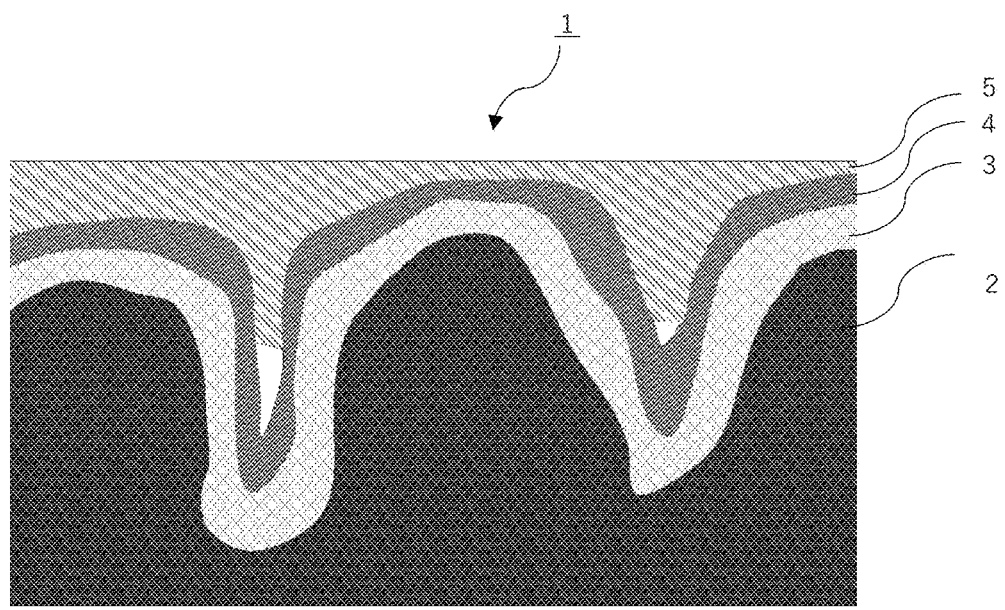

SOLID ELECTROLYTIC CAPACITOR, AND METHOD FOR PRODUCING SOLID ELECTROLYTIC CAPACITOR

TECHNICAL FIELD

The present invention relates to a solid electrolytic capacitor and a method for producing a solid electrolytic capacitor.

BACKGROUND FIELD

A capacitor is a kind of electronic component used in various electronics such as personal computers and mobile phones and, basically, has a structure in which a dielectric is held between two opposing electrode plates. When a DC voltage is applied to the plates, electric charges are stored in each electrode by the polarization action of the dielectric. There are many types of capacitors and, for example, an aluminum electrolytic capacitor, a multilayer ceramic capacitor, a tantalum electrolytic capacitor, a film capacitor, and the like are known. In recent years, as electronics has become smaller, lighter, and more functional, small and high capacity capacitors are demanded, and a capacitor using a conductive polymer as a solid electrolyte is studied actively.

A solid electrolytic capacitor using a conductive polymer as a solid electrolyte usually uses a porous metal such as aluminum or tantalum as an anode. In particular, in a solid electrolytic capacitor that uses aluminum and forms a conductive polymer layer, the surface of the anode is etched to form etching pits, and a conductive polymer is formed inside the etching pits. Since the size of the etching pits formed by this etching are usually several-hundred nanometers, it is difficult to form a conductive polymer layer in the deep part of the etching pits.

For this reason, it is attempt that, before forming the conductive polymer layer having high conductivity, the entire surface of the etching pits is thinly coated in advance with a water-soluble self-doping type conductive polymer, which easily enters the etching pits, and further coated with (3,4-ethylenedioxythiophene)/polystyrenesulfonic acid (PEDOT/PSS), which is a water-soluble conductive polymer with high conductivity to compensate the decrease in capacitance caused by the part where the conductive polymer with high conductivity cannot enter. (Patent Literature 1)

CITATION LIST

Patent Literature

Patent Literature 1: WO2013/081099

SUMMARY OF INVENTION

Technical Problem

However, in the solid electrolytic capacitor of Patent Literature 1, when the second layer of a conductive polymer having high conductivity is coated, a part of the water-soluble self-doping type conductive polymer is removed, which causes problems that the capacity is reduced and the ESR characteristic is increased.

The present invention has been made in view of such circumstances, and an object thereof is to provide a solid electrolytic capacitor having excellent capacitance and ESR characteristics and a method for manufacturing thereof.

Solution to Problem

According to the present invention, a solid electrolytic capacitor, comprising:

an anode body having pores; a dielectric; a first conductive polymer layer; and a second conductive polymer layer; wherein the dielectric is formed on a surface of the anode body, the first conductive polymer layer includes a first conductive polymer having at least one of structural units represented by the following formula (1) and the following formula (2) and is formed on the dielectric, in the formulas (1) and (2), $R^1$ is an alkyl group having 1 to 12 carbon atoms, an alkoxy group having 1 to 12 carbon atoms, an alkylene oxide group having 1 to 12 carbon atoms, an aromatic group, or a heterocyclic group, each of which optionally has a substituent, $A^-$ is a monoanion derived from a dopant and n is 2 or more and 300 or less, and the second conductive polymer layer includes a second conductive polymer different from the first conductive polymer and is formed on the first conductive polymer layer. is provided.

[chemical formula 1]

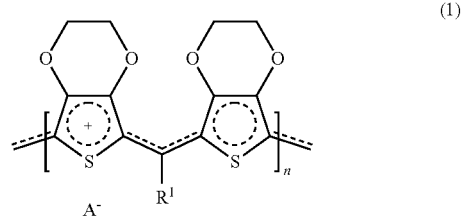

(1)

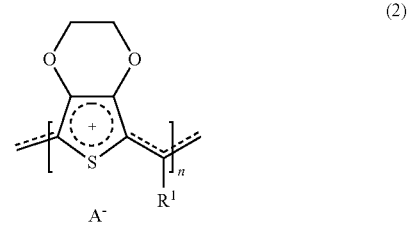

(2)

The solid electrolytic capacitor of the present invention uses the first conductive polymer having the structural unit represented by the formula (1) or (2) as the first layer, so that the conductive polymer can enter the anode body well. Further, the first conductive polymer is mainly composed of a monoanion as a dopant and has a small amount of free sulfonic acid and high hydrophobicity, so that it is difficult to be removed when forming the second conductive polymer layer. Therefore, the present invention can provide the solid electrolytic capacitor having excellent capacitance and ESR characteristics. In addition, since the conductive polymer having the structural unit represented by the formula (1) or (2) is a thiophene-based compound having excellent heat resistance unlike polyaniline, the obtained solid electrolytic capacitor also has excellent heat resistance.

The following are various examples of the present invention. The following embodiments can be combined with each other.

Preferably, $R^1$ in the formula (1) or the formula (2) is an aromatic group which optionally has a substituent.

According to another aspect of the present invention, a method for manufacturing a solid electrolytic capacitor, comprising:

a step of forming a first conductive polymer layer; and
a step of forming a second conductive polymer layer;

wherein
the step of forming the first conductive polymer layer includes impregnating an anode body and a porous body with a dispersion including a first conductive polymer dispersed in a solvent to form the first conductive polymer layer,
the anode body has pores,
the porous body includes a dielectric covering a surface of the anode body,
the first conductive polymer includes at least one of the structural units represented by the following formula (1) and the following formula (2),
in the formulas (1) and (2), $R^1$ is an alkyl group having 1 to 12 carbon atoms, an alkoxy group having 1 to 12 carbon atoms, an alkylene oxide group having 1 to 12 carbon atoms, an aromatic group, or a heterocyclic group, each of which optionally has a substituent, $A^-$ is a monoanion derived from a dopant and n is 2 or more and 300 or less,
the step of forming the second conductive polymer layer includes
impregnating the porous body with a dispersion including a second conductive polymer dispersed in an aqueous solvent or
polymerizing a monomer on the porous body to synthesize the second conductive polymer
to form the second conductive polymer layer, and
the second conductive polymer is different from the first conductive polymer.
is provided.

BRIEF DESCRIPTION OF DRAWINGS

FIG. 1 is a schematic diagram showing a partial structure of an example of a solid electrolytic capacitor of the present invention.

MODE FOR CARRYING OUT THE INVENTION

The embodiments of the present invention will be described in detail as below.
The solid electrolytic capacitor of the present invention has an anode body, a dielectric, a first conductive polymer layer, and a second conductive polymer layer, which will be described in detail below.
FIG. 1 shows a partial structure of an example of a solid electrolytic capacitor. The solid electrolytic capacitor 1 shown in FIG. 1 has a dielectric 3 that is an oxide film formed on the surface of an anode body 2, a first conductive polymer layer 4 formed on the dielectric 3, and a second conductive polymer layer 5, which are formed in this order.
The method for manufacturing a solid electrolytic capacitor of the present invention comprises: a step of impregnating a porous body with a dispersion including a first conductive polymer dispersed in a solvent to form a first conductive polymer layer and a step of forming a second conductive polymer layer by impregnating the porous body with a dispersion including a second conductive polymer dispersed in an aqueous solvent, or by polymerizing a monomer on the porous body to synthesize the second conductive polymer.
(1) Anode Body
The anode body included in the present invention has pores and is not particularly limited as long as it is normally used as an anode of a solid electrolytic capacitor. The anode body may include a material containing aluminum, tantalum, niobium or an alloy thereof.

When aluminum is used as an anode, for example, an anode body having pores can be obtained by etching the surface of an aluminum foil in a flat plate shape. As the method of etching the surface of the aluminum foil, AC etching is usually used. When tantalum or niobium is used as an anode, for example, an anode body having pores can be obtained by sintering tantalum or niobium particles. The method for sintering the particles is not particularly limited and includes a method in which the particles are once compressed to form a pellet and then heated and sintered. For example, a tantalum sintered element can be manufactured in accordance with the test condition of 100 kCV powder specified in Table 1 of the appendix of "Test method of tantalum sintered anodes for electrolytic capacitors" of Standard of Electronic Industries Association of Japan EIAJ RC-2361A.

The average pore diameter of the anode body having pores is preferably 0.01 μm or more and 10.0 μm or less, more preferably 0.03 μm or more and 5.0 μm or less, for example, 0.01, 0.02, 0.03, 0.05, 0.1, 0.2, 0.3, 0.4, 0.5, 0.6, 0.8, 1.0, 1.5, 2.0, 3.0, 5.0, 6.0, 8.0, 10.0 μm, and the like, and may be within the range between any two of the numerical values exemplified here. The average pore size of the anode body can be measured by a mercury intrusion porosimetry.

(2) Dielectric

The dielectric used in the present invention is formed on the surface of the anode body. In the present invention, a porous body obtained by oxidizing the surface of the anode body is usually used.

The method of oxidizing the surface of the anode body is not particularly limited and includes anodizing by applying a voltage for about 5 to 90 minutes in an aqueous solution containing a weak acid such as phosphoric acid or adipic acid.

In the present invention, the anode body that is cut, bent, or wound after its surface is oxidized may be used as the porous body. In such a case, since the dielectric may have damage such as cracks, it is preferable to perform repair chemical conversion treatment by re-oxidizing in a weak acid such as phosphoric acid or adipic acid. The thickness of the dielectric film can be measured, for example, by a method of observing a cross section of the porous body with a scanning electron microscope (manufactured by Hitachi High-Technologies Corporation).

(3) First Conductive Polymer Layer

The first conductive polymer layer included in the present invention includes a first conductive polymer having at least one of the structural units represented by the following formula (1) or the following formula (2), which is formed on the dielectric.

[chemical formula 1]

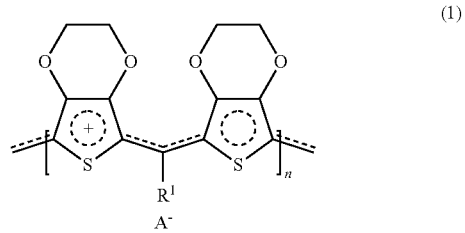

(1)

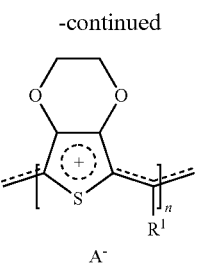

(2)

In the formulas (1) and (2), $R^1$ is an alkyl group having 1 to 12 carbon atoms, an alkoxy group having 1 to 12 carbon atoms, an alkylene oxide group having 1 to 12 carbon atoms, an aromatic group, or a heterocyclic group, each of which optionally has a substituent. $A^-$ is a monoanion derived from a dopant. n is 2 or more and 300 or less.

Since $A^-$ is a monoanion derived from a dopant, the first conductive polymer has high hydrophobicity and is hardly removed when the second conductive polymer layer is formed.

The alkyl group having 1 to 12 carbon atoms may be linear, branched, or cyclic, and may include 1 to 8 carbon atoms, 1 to 6 carbon atoms, or 1 to 4 carbon atoms. Specifically, it includes methyl, ethyl, n-propyl, isopropyl, n-butyl, t-butyl, cyclopentyl, cyclohexyl, bornyl, isobornyl, dicyclopentanyl and adamantyl groups.

The alkoxy group having 1 to 12 carbon atoms may be linear, branched, or cyclic, and may include 1 to 8 carbon atoms, 1 to 6 carbon atoms, or 1 to 4 carbon atoms.

The alkylene oxide group having 1 to 12 carbon atoms may include 1 to 8 carbon atoms, 1 to 6 carbon atoms, and 1 to 4 carbon atoms.

The aromatic group may include a phenyl group, a benzyl group, and various condensed ring groups. The condensed ring group may include naphthalene ring, azulene ring, anthracene ring, phenanthrene ring, pyrene ring, chrysene ring, naphthacene ring, triphenylene ring, acenaphthene ring, coronene ring, fluorene ring, fluoranthrene ring, pentacene ring, perylene ring, pentaphene ring, a picene ring and a pyranthrene ring.

As the heterocyclic group, for example, silole ring, furan ring, thiophene ring, oxazole ring, pyrrole ring, pyridine ring, pyridazine ring, pyrimidine ring, pyrazine ring, triazine ring, oxadiazole ring, triazole ring, imidazole ring, pyrazole. ring, thiazole ring, indole ring, benzimidazole ring, benzthiazole ring, benzoxazole ring, quinoxaline ring, quinazoline ring, phthalazine ring, thienothiophene ring, carbazole ring, azacarbazole ring (which represents that any one or more of the carbon atoms constituting the carbazole ring is replaced by a nitrogen atom), dibenzosilole ring, dibenzofuran ring, dibenzothiophene ring, ring in which any one or more of carbon atoms constituting benzothiophene ring or dibenzofuran ring is replaced by nitrogen atom, benzodifuran ring, benzodithiophene ring, acridine ring, benzoquinoline ring, phenazine ring, phenanthridine ring, phenanthroline ring, cyclazine ring, kindrin ring, tepenidine ring, quinindrine ring, triphenodithiazine ring, triphenodioxazine ring, phenanthrazine ring, anthrazine ring, perimidine ring, naphthofuran ring, naphtho thiophene ring, naphthodifuran ring, naphthodithiophene ring, anthrafuran ring, anthradifuran ring, anthrathiophene ring, anthradithiophene ring, thianthrene ring, phenoxathiin ring, dibenzocarbazole ring, indolocarbazole ring, dithienobenzene ring, epoxy ring, aziridine ring, thiirane ring, oxetane ring, azetidine ring, thietane ring, tetrahydrofuran ring, dioxolane ring, pyrrolidine ring, pyrazolidine ring, imidazolidine ring, oxazolidine ring, tetrahydrothiophene ring, sulfolane ring, thiazolidine ring, ε-caprolactone ring, ε-caprolactam ring, piperidine ring, hexahydropyridazine ring, hexahydropyrimidine ring, piperazine ring, morpholine ring, tetrahydropyran ring, 1,3-dioxane ring, 1,4-dioxane ring, trioxane ring, tetrahydrothiopyran ring, thiomorpholine ring, thiomorpholine-1,1-dioxide ring, pyranose ring, diazabicyclo [2,2,2]-octane ring, phenoxazine ring, phenothiazi ring, okisantoren ring, thioxanthene ring, monovalent group derived from phenoxathiin ring can be mentioned.

A substituent optionally included may include an alkyl group having 1 to 12 carbon atoms, an alkoxy group having 1 to 12 carbon atoms, an alkylene oxide group having 1 to 12 carbon atoms, an aromatic group, a hydroxy group, a halogen such as a fluorine, a chlorine, a bromine, a iodine, an aldehyde group, an amino group, a cycloalkyl group having 3 to 8 carbon atoms.

From the viewpoint of preventing the first conductive polymer from being removed when forming the second conductive polymer layer, $R^1$ is preferably an aromatic group, more preferably a phenyl group or a naphthyl group which optionally has a substituent in order to increase the hydrophobicity of the first conductive polymer.

The dopant is not particularly limited as long as it is derived from a monoanion and preferably includes at least one atom selected from the group consisting of oxygen, fluorine, and nitrogen, and more preferably at least one selected from the group consisting of a sulfonic acid derivative, a boronic acid derivative, a carboxylic acid derivative, and a phosphoric acid derivative.

The dopant includes, specifically, a monoanion such as p-toluenesulfonic acid, dodecylsulfonic acid, dodecylbenzenesulfonic acid, di (2-ethylhexyl) sulfosuccinic acid, tetrafluoroboric acid, trifluoro acetic acid, hexafluorophosphoric acid, trifluoromethanesulfonimide and the like, or alkali metal salt thereof.

One kind of dopant may be used alone, or two or more kinds may be used.

The number of structural units (1) and (2) that the first conductive polymer has is not particularly limited, is preferably 2 or more and 300 or less. Specifically, it may be, for example, 2, 5, 10, 20, 30, 40, 50, 60, 70, 80, 90, 100, 200 or 300, and within a range between any two of the numerical values exemplified here.

The conductivity of the conductive polymer is preferably 0.01 S/cm or more and 1000 S/cm or less, for example, 0.02, 0.03, 0.05, 0.1, 0.2, 0.3, 0.5, 0.8, 1, 2, 5, 10, 50, 100, 200, 300 500, 600, 800 S/cm or the like, and may be within a range between any two of the numerical values exemplified here.

The content ratio of the structural units (1) and (2) contained in the first conductive polymer can be adjusted by the ratio of amount of EDOT and aldehyde added. The mole ratio of EDOT and aldehyde added, EDOT/aldehyde, is 1/1, 2/1, 3/1, 4/1, and 5/1, for example, and may be within the range between any two of the numerical values. From the viewpoint of the balance between solubility and conductivity, a ratio of 1/1 to 4/1 is preferable, and a ratio of 1/1 to 2/1 is more preferable.

The method of synthesizing the first conductive polymer is not particularly limited. For example, it can be obtained by adding a dopant and an oxidizing agent to 3,4-ethylenedioxythiophene (EDOT) and an aldehyde, and heating and stirring them in a solvent under an inert gas atmosphere to polymerize. Further, a decomposition accelerator of an oxidizing agent may be added.

The oxidant is not particularly limited as long as the polymerization reaction proceeds. For example, ammonium peroxodisulfate, potassium peroxodisulfate, sodium peroxodisulfate, iron chloride (III), iron sulfate (III), iron hydroxide. (III), iron tetrafluoroborate (III), hexafluorophosphoric acid iron (III), copper sulfate (II), copper chloride (II), copper tetrafluoroborate (II), hexafluorophosphoric acid copper (II), ammonium oxodisulfate, organic peroxide, and the like can be mentioned.

The solvent is not particularly limited as long as the reaction between the heterocyclic compound and the aldehyde derivative proceeds. As a solvent, alcohol solvents such as γ-butyrolactone, propylene carbonate, ethylene carbonate, acetonitrile, tert-butyl methyl ether, ethyl acetate, benzene, heptane, water, methanol, ethanol, isopropyl alcohol, butanol, and ketone solvent such as acetone, methyl ethyl ketone, methyl isobutyl ketone, and glycol solvents such as methyl cellosolve, ethyl cellosolve, propylene glycol methyl ether, propylene glycol ethyl ether, and lactic acid solvents such as methyl lactate and ethyl lactate, and the like can be mentioned. From the viewpoint of the efficiency of the oxidizing agent, an aprotic solvent is preferable.

The method for forming the first conductive polymer layer is not particularly limited. For example, a method of impregnating the anode body having pores and the porous body, which includes a dielectric covering a surface of the anode body, with a dispersion including a first conductive polymer dispersed in a solvent to remove at least a part of the non-aqueous solvent may be used.

The method for impregnating the porous body with the dispersion including the first conductive polymer generally includes immersing the porous body, and increasing or decreasing the pressure and applying vibration, ultrasonic waves, or heat.

The method for removing the solvent is not particularly limited and may include a drying method, a heating method, and a combination thereof. As the heating method, a method of holding in a heating chamber and a method of contacting with a hot plate can be mentioned. From the viewpoint of preventing the denaturation of the porous body, the heating temperature is preferably 350° C. or lower, more preferably 250° C. or lower. From the viewpoint of quickly removing the solvent, the heating temperature is preferably 100° C. or higher, more preferably 120° C. or higher.

The non-aqueous solvent is not particularly limited as long as the conductive polymer can be dispersed in it. As a non-aqueous solvent is alcohol solvents such as methanol, ethanol, isopropyl alcohol, butanol, ketone solvents such as acetone, methyl ethyl ketone, methyl isobutyl ketone, glycol solvents such as methyl cellosolve, ethyl cellosolve, propylene glycol methyl ether, propylene glycol ethyl ether, lactic acid solvents such as methyl lactate and ethyl lactate, toluene, ethyl acetate, propylene carbonate, γ-butyrolactone, methyl ethyl ketone, toluene, isopropyl alcohol, ethylene glycol, dimethyl sulfoxide, methanol, benzyl alcohol and the like can be mentioned. Propylene carbonate, γ-butyrolactone, methyl ethyl ketone, toluene, isopropyl alcohol, ethylene glycol, dimethyl sulfoxide, methanol, benzyl alcohol and the like are particularly preferred. A plurality of solvents may be used in combination. The solvent may be the same as or different from the solvent used for synthesizing the first conductive polymer.

The non-volatile content excluding the solvent component from the dispersion is not particularly limited, but is, for example, 1.0 mass % or more and 20.0 mass % or less, specifically, 0.5, 1.0, 1.5, 2.0, 2.5, 3.0, 5.0, 10.0, 15.0, 20.0 mass %, and the like, and may be within a range between any two of the numerical values exemplified here.

The average particle diameter of the first conductive polymer in the dispersion is preferably small from the viewpoint of easy introduction of the conductive polymer into the pores of the porous body. For example, D10 is 0.5 nm, 1 nm, 3 nm, 5 nm, 10 nm, 25 nm, 40 nm, 50 nm, and the like, and may be in the range between any two of these numerical values. D50 is 0.5 nm, 1 nm, 3 nm, 5 nm, 10 nm, 20 nm, 40 nm, 55 nm, 80 nm, 100 nm, and the like, and may be within the range between any two of these numbers. D90 is 1 nm, 5 nm, 10 nm, 40 nm, 85 nm, 100 nm, 120 nm, and the like, and may be within the range between any two of these numbers. D90/D10, which is the ratio of D90 and D10, is 1, 1.5, 2, 2.5, 3.5, 4, 4.5, 5, and the like, and may be within the range between any two of the numerical values exemplified here. The particle size can be measured, for example, by using a particle diameter distribution measuring device (Nanotrac UPA-UT151, manufactured by Nikkiso Co., Ltd.) by photodynamic scattering method.

(4) Second Conductive Polymer Layer

The second conductive polymer layer included in the present invention includes a second conductive polymer different from the first conductive polymer and is formed on the first conductive polymer layer.

The conductive polymer used as the second conductive polymer includes, for example, those derived from polyaniline, polypyrrole, polythiophene or derivatives thereof. The conductive polymer is preferably poly (3,4-ethylenedioxythiophene) (PEDOT). The dopant is not particularly limited but includes polystyrene sulfonic acid (PSS).

From the viewpoint of improving the ESR characteristics of the solid electrolytic capacitor, the conductivity of the second conductive polymer layer is preferably 10 S/m or more, more preferably 50 S/m or more, even more preferably 100 S/m or more, for example, 10, 15, 20, 30, 40, 50, 60, 70, 80, 100, 200, 500 S/m, and the like and may be within the range between any two of the numerical values exemplified here.

As the method of forming the second conductive polymer layer, a method of impregnating a porous body with a dispersion including the second conductive polymer dispersed in an aqueous solvent, and a method of polymerizing a monomer on the porous body to synthesizing the second conductive polymer can be mentioned.

The method of impregnating the porous body with the dispersion of the second conductive polymer and the method of removing the solvent can be the same as the method used for the first conductive polymer.

The method of polymerizing the monomer on the porous body is not particularly limited, but, for example, can be performed by impregnating the porous body with a mixed solution containing the monomer and the oxidizing agent and leaving it. After polymerizing the monomer on the porous body, it is preferable to remove unnecessary components such as unreacted monomer by washing with water.

EXAMPLES

Manufacture of Dispersions

Production Example 1

300 g of propylene carbonate, 4.5 g of 3,4-ethylenedioxythiophene (EDOT), and 3.6 g of PTS.H$_2$O (p-toluenesulfonic acid monohydrate) were added to a 1 L flask and stirred for 30 min. Then, under nitrogen perge, 0.06 g of Iron (III) tris(4-methylbenzenesulfonate) (Fe(PTS)$_3$), 2.4 g of 2,4,6-trimethylbenzaldehyde, 12 g of benzoyl peroxide (purity 75 mass %, manufactured by Nihonyushi Corporation) were further added and the mixture was stirred at 40° C. for 20 hours. Then, 1 g of Lewatit (registered trademark) MP62WS (manufactured by LANXESS) and 1 g of Lewatit (registered trademark) monoplus S108H (manufactured by LANXESS), which were ion exchange resins, were added and the resulting mixture was stirred for 5 hours, and filtered. The obtained filtrate was treated with an ultrasonic homogenizer to obtain a propylene carbonate dispersion A of a conductive polymer with a non-volatile content of 2.4 mass %.

Production Example 2

A propylene carbonate dispersion B of a conductive polymer with a non-volatile content of 2.6 mass % was obtained by the same procedure except that 2.4 g of 2,4,6-trimethylbenzaldehyde in Production Example 1 was changed to 2.8 g of 2,6-dichlorobenzaldehydes.

Production Example 3

A propylene carbonate dispersion C of a conductive polymer with a non-volatile content of 2.1 mass % was obtained by the same procedure except that 2.4 g of 2,4,6-trimethylbenzaldehyde in production example 1 was changed to 0.58 g of butylaldehyde.

Production Example 4

A propylene carbonate dispersion D of a conductive polymer with a non-volatile content of 2.1 mass % was obtained by the same procedure except that 2.4 g of 2,4,6-trimethylbenzaldehyde in Production Example 1 was changed to 0.85 g of benzaldehyde.

Production Example 5

A propylene carbonate dispersion E of a conductive polymer with a non-volatile content of 2.1 mass % was obtained by the same procedure except that 2.4 g of 2,4,6-trimethylbenzaldehyde in Production Example 1 was changed to 1.25 g of 2-naphthaldehyde.

Production Example 6

200 g of acetonitrile and 3.5 g of 2,6-dichlorobenzaldehyde were added to a 1 L flask. The mixture was heated to 80° C. after nitrogen purge was performed for 30 min. Next, 6.2 g of copper tetrafluoroborate hydrate was added and the resultant mixture was stirred until a homogeneous solution was obtained. Then 2.8 g of EDOT was added and the resultant mixture was stirred for 1 hour. Further, 6.2 g of copper tetrafluoroborate hydrate was added and the resultant mixture was stirred for 4 hours. 200 g of methanol was added to the flask to sufficiently precipitate solids, and then suction filtration was performed with ADVANTEC 4 A filter paper (JIS P 3801), and the residue was washed with methanol until the filtrate became transparent. Thereafter, the residue was dried at 40° C. to obtain 5.2 g of a conductive polymer powder E.
9.87 g of propylene carbonate was added to 0.13 g of the conductive polymer E, and the mixture was stirred, and dispersed with an ultrasonic homogenizer to obtain a propylene carbonate dispersion F of a conductive polymer with a non-volatile content of 1.3 mass %.

Production Example 7

A propylene carbonate dispersion G of a conductive polymer with a non-volatile content of 2.3 mass % was obtained by the same procedure except that PTS.H$_2$O in Production Example 2 was changed to 2.2 g of trifluoromethanesulfonimide Production Example 8

A propylene carbonate dispersion H of a conductive polymer with a non-volatile content of 2.3 mass % was obtained by the same procedure except that PTS.H$_2$O in Production Example 2 was changed to 1.8 g of trifluoroacetic acid.

Production Example 9

A propylene carbonate dispersion I of a conductive polymer with a non-volatile content 2.3 mass % was obtained by the same procedure except that PTS.H$_2$O in Production Example 2 was changed to 4.2 g of 55 mass % aqueous solution of hexafluorophosphoric acid.

Production Example 10

A γ-butyrolactone dispersion J of a conductive polymer with a non-volatile content of 2.5 mass % was obtained in the same procedure except that propylene carbonate in Production Example 1 was changed to γ-butyrolactone (γ-BL).

Production Example 11

20 g of methyl ethyl ketone was added to 82 g of the liquid A produced in Production Example 1 and the resultant mixture was stirred to obtain a dispersion K of a non-volatile content of 2.0 mass %.

Production Example 12

20 g of toluene was added to 82 g of the liquid A produced in Production Example 1 and the resultant mixture was stirred to obtain a dispersion L with a non-volatile content of 2.0 mass %.

Production Example 13

50 g of isopropyl alcohol was added to 51.2 g of the liquid A produced in Production Example 1 and the resultant mixture was stirred to obtain a dispersion M with a non-volatile content of 1.3 mass %.

Production Example 14

50 g of ethylene glycol was added to 51.2 g of the liquid A produced in Production Example 1 and the resultant mixture was stirred to obtain a dispersion N with a non-volatile content of 1.3 mass %.

Production Example 15

1 g of poly (isothianaphthenediyl-sulfonate) was dispersed in 99 g of water to obtain a dispersion 0 with a non-volatile content of 1 mass %.

Production Example 16

1 g of polyaniline using sodium sulfosuccinate as a dopant was dispersed in 99 g of isopropyl alcohol to obtain a dispersion P with a non-volatile content of 1 mass %.

[Manufacture of Porous Body]

An aluminum etching foil for low voltage manufactured by Showa Denko Co., Ltd. was subjected to chemical conversion treatment with an aqueous solution of ammonium adipate (75 g/L) at 5 V for 30 minutes to form an aluminum dielectric oxide film on the surface. Subsequently, this aluminum etching foil was cut into a flat plate having a size of 10×10 mm. The plate was immersed in an aqueous solution of ammonium dihydrogen phosphate (0.5 g/L), and subjected to restoring chemical conversion at 5 V for 40 minutes to form a porous body. By measured the pore distribution of this porous body, it was confirmed that it had pores of at least about 30 nm. The pore distribution was measured by using a pore distribution measuring device (Micromeritec Autopore III 9400, manufactured by Shimadzu Corporation) by mercury intrusion porosimetry.

Manufacture of Solid Electrolytic Capacitor

Example 1

The porous body was impregnated with the dispersion A and dried at 150° C. for 10 minutes to form a first conductive polymer layer. Next, the porous body was impregnated with an aqueous solution including PEDOT dispersed in water and dried at 130° C. for 10 minutes to form a second conductive polymer layer. A carbon layer was applied on the second conductive polymer layer and dried at 160° C. for 30 minutes. Then a silver paste layer was applied and dried at 160° C. for 1 hour to form a cathode conductor layer to obtain the solid electrolytic capacitor of Example 1

Example 2

The porous body was impregnated with the dispersion A and dried at 150° C. for 10 minutes to form a first conductive polymer layer. Then, an ethanol solution containing EDOT as a monomer and ferric p-toluenesulfonic acid as an oxidizing agent in a molar ratio of 1:3 was prepared. After the porous body was impregnated with the ethanol solution for 20 minutes, it was pulled up, and left for 10 minutes. Thereafter, excess monomer was removed by washing with water, and a polymerization reaction was performed by heating at 150° C. for 1 hour to form a second conductive polymer layer. A carbon layer was applied on the second conductive polymer layer and dried at 160° C. for 30 minutes. Then a silver paste layer was applied and dry at 160° C. for 1 hour to form a cathode conductor layer to obtain the solid electrolytic capacitor of Example 2.

Examples 3 to 15

The solid electrolytic capacitors of Examples 3 to 15 were obtained in the same manner as in Example 1 except that Dispersion A was changed to Dispersions B to N.

Comparative Example 1

The solid electrolytic capacitor of Comparative Example 1 was obtained in the same manner as in Example 1 except that Dispersion A was changed to Dispersion 0, and an amine treatment with decanediamine was performed after forming the first conductive polymer layer.

Comparative Example 2

The solid electrolytic capacitor of Comparative Example 2 was obtained in the same manner as in Example 2 except that Dispersion A was changed to Dispersion 0, and an amine treatment with decanediamine was performed after forming the first conductive polymer layer.

Comparative Example 3

The solid electrolytic capacitor of Comparative Example 3 was obtained in the same manner as in Example 1, except that Dispersion A was changed to Dispersion P.

Comparative Example 4

The solid electrolytic capacitor of Comparative Example 4 was obtained in the same manner as in Example 1 except that the second conductive polymer layer was formed directly on the porous body without forming the first conductive polymer layer.

[Various Evaluations]

<Evaluation of Capacitance>

The capacitances at 120 Hz of the solid electrolytic capacitors of Examples 1 to 15 and Comparative Examples 1 to 4 were measured by using an LCR meter 2345 (manufactured by NF Corporation) as characteristics of the electrolytic capacitors. Tables 1 and 2 show the results.

<ESR Evaluation>

The ESRs at 120 Hz and 100 kHz of the solid electrolytic capacitors of Examples 1 to 15 and Comparative Examples 1 to 4 were measured by using an LCR meter 2345 (manufactured by NF Corporation) as characteristics of the electrolytic capacitors. Tables 1 and 2 show the results.

TABLE 1

|  |  | First conductive polymer | | Mole ratio | | Various evaluations | | |
|---|---|---|---|---|---|---|---|---|
|  | Dispersion | $R^1$ | A | EDOT/ Aldehyde | Dispersion medium | Capacitance at 120 Hz(μF) | ESR at 120 Hz(Ω) | ESR at 100 kHz(mΩ) |
| Example 1 | A | 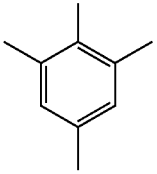 |  $SO_3$ | 2/1 | PC | 13.8 | 2.0 | 22 |
| Example 2 |  |  |  |  |  | 13.5 | 2.1 | 19 |

TABLE 1-continued

| | Dispersion | First conductive polymer R¹ | A | Mole ratio EDOT/ Aldehyde | Dispersion medium | Capacitance at 120 Hz(μF) | ESR at 120 Hz(Ω) | ESR at 100 kHz(mΩ) |
|---|---|---|---|---|---|---|---|---|
| Example 3 | B | 2,6-dichlorophenyl* | | 2/1 | PC | 13.2 | 2.3 | 20 |
| Example 4 | C | n-butyl* | | 4/1 | PC | 12.5 | 2.9 | 49 |
| Example 5 | D | phenyl* | | 4/1 | PC | 12.2 | 2.8 | 32 |
| Example 6 | E | 1-naphthyl* | | 4/1 | PC | 11.8 | 2.9 | 35 |
| Example 7 | F | * | BF4 | 1/1 | PC | 10.9 | 2.8 | 39 |
| Example 8 | G | 2,6-dichlorophenyl* | (CF3SO2)N | 2/1 | PC | 13.4 | 2.1 | 21 |
| Example 9 | H | 2,6-dichlorophenyl* | CF3COO | 2/1 | PC | 12.9 | 2.2 | 21 |
| Example 10 | I | 2,6-dichlorophenyl* | PF6 | 2/1 | PC | 13.3 | 2.7 | 21 |
| Example 11 | J | mesityl* | SO3-p-tolyl | 2/1 | γBL | 13.8 | 2.5 | 23 |
| Example 12 | K | mesityl* | SO3-p-tolyl | 2/1 | PC/MEK = 8/2 | 13.4 | 2.1 | 21 |
| Example 13 | L | mesityl* | SO3-p-tolyl | 2/1 | PC/To = 8/2 | 11.2 | 2.9 | 32 |
| Example 14 | M | mesityl* | SO3-p-tolyl | 2/1 | PC/IPA = 5/5 | 11.5 | 2.7 | 31 |
| Example 15 | N | mesityl* | SO3-p-tolyl | 2/1 | PC/EG = 5/5 | 13.5 | 2.6 | 20 |

TABLE 2

| | Dispersion | Conductive polymer in first layer | Dispersion medium | Capacitance at 120 Hz (μF) | ESR at 120 Hz (Ω) | ESR at 100 kHz (mΩ) |
|---|---|---|---|---|---|---|
| Comparative Example1 | O | poly(isothianaphthenediyl-sulfonate) | water | 9.2 | 3.7 | 58 |
| Comparative Example2 | | | | 9.8 | 4.1 | 82 |
| Comparative Example3 | P | polyaniline/sodium sulfosuccinate | IPA | 9.1 | 4.1 | 120 |
| Comparative Example4 | | — | | 8.8 | 4.2 | 102 |

The details of the abbreviations in the table are as follows.
PC: propylene carbonate
γBL: γ-butyrolactone
MEK: methyl ethyl ketone
To: toluene
IPA: isopropyl alcohol
EG: ethylene glycol

DISCUSSION

As shown in Examples 1 to 15, the solid electrolytic capacitors of the present invention show excellent capacitances and ESR characteristics compared to those of Comparative Examples 1 to 4 not using the first conductive polymer. This indicates that since the first conductive polymer used in the Examples is well impregnated the pores and has excellent water resistance and alcohol resistance, the elution during the formation of the second conductive polymer is less. Further, in Comparative Example 3, when the element was impregnated with the first conductive polymer, a large amount of conductive polymer was deposited on the surface layer. It is considered that the first conductive polymer did not sufficiently impregnate the inside, which hindered the impregnation of the second conductive polymer.

REFERENCE LIST 1 solid electrolytic capacitor
2 anode body
3 dielectric
4 first conductive polymer layer
5 second conductive polymer layer

The invention claimed is:

1. A solid electrolytic capacitor, comprising:
an anode body having pores; a dielectric; a first conductive polymer layer; and a second conductive polymer layer;
wherein
the dielectric is formed on a surface of the anode body,
the first conductive polymer layer includes a first conductive polymer having at least one of structural units represented by the following formula (1) and the following formula (2) and is formed on the dielectric,

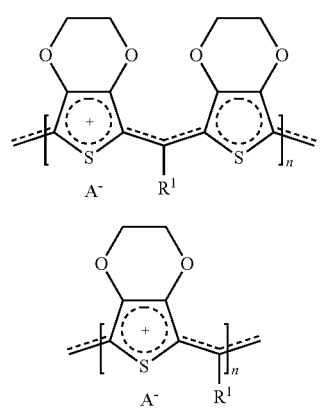

in the formulas (1) and (2), $R^1$ is an alkyl group having 1 to 12 carbon atoms, an alkoxy group having 1 to 12 carbon atoms, an alkylene oxide group having 1 to 12 carbon atoms, an aromatic group, or a heterocyclic group, each of which optionally has a substituent, $A^-$ is a monoanion derived from a dopant and n is 2 or more and 300 or less, and the second conductive polymer layer includes a second conductive polymer different from the first conductive polymer and is formed on the first conductive polymer layer.

2. The solid electrolytic capacitor according to claim 1, wherein $R^1$ in the formula (1) or the formula (2) is an aromatic group which optionally has a substituent.

3. A method for manufacturing a solid electrolytic capacitor, comprising:
a step of forming a first conductive polymer layer; and
a step of forming a second conductive polymer layer;
wherein
the step of forming the first conductive polymer layer includes impregnating an anode body and a porous body with a dispersion including a first conductive polymer dispersed in a solvent to form the first conductive polymer layer,
the anode body has pores,
the porous body includes a dielectric covering a surface of the anode body,
the first conductive polymer includes at least one of the structural units represented by the following formula (1) and the following formula (2),

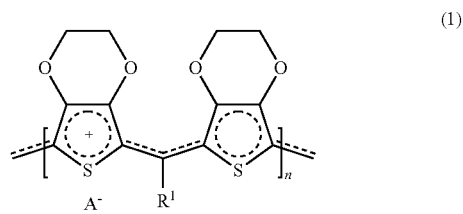

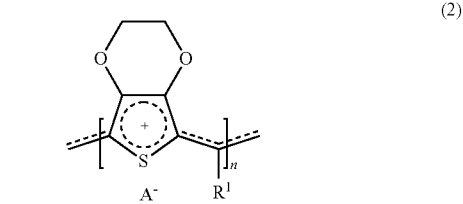

in the formulas (1) and (2), $R^1$ is an alkyl group having 1 to 12 carbon atoms, an alkoxy group having 1 to 12 carbon atoms, an alkylene oxide group having 1 to 12 carbon atoms, an aromatic group, or a heterocyclic group, each of which optionally has a substituent, $A^-$ is a monoanion derived from a dopant and n is 2 or more and 300 or less,
the step of forming the second conductive polymer layer includes
impregnating the porous body with a dispersion including a second conductive polymer dispersed in an aqueous solvent or
polymerizing a monomer on the porous body to synthesize the second conductive polymer
to form the second conductive polymer layer, and
the second conductive polymer is different from the first conductive polymer.

* * * * *